US008493398B2

(12) United States Patent
Comparan et al.

(10) Patent No.: US 8,493,398 B2
(45) Date of Patent: Jul. 23, 2013

(54) DYNAMIC DATA TYPE ALIGNED CACHE OPTIMIZED FOR MISALIGNED PACKED STRUCTURES

(75) Inventors: Miguel Comparan, Rochester, MN (US); Russell Dean Hoover, Rochester, MN (US); Eric Oliver Mejdrich, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1208 days.

(21) Appl. No.: 12/013,780

(22) Filed: Jan. 14, 2008

(65) Prior Publication Data
US 2009/0179902 A1 Jul. 16, 2009

(51) Int. Cl.
*G09G 5/36* (2006.01)
*G06T 1/20* (2006.01)

(52) U.S. Cl.
USPC .......................................... 345/557; 345/506

(58) Field of Classification Search
USPC ........................................................ 345/557
See application file for complete search history.

(56) References Cited

U.S. PATENT DOCUMENTS

| | | | | |
|---|---|---|---|---|
| 5,379,393 A * | 1/1995 | Yang | | 711/3 |
| 5,961,628 A * | 10/1999 | Nguyen et al. | | 712/2 |
| 6,915,385 B1 * | 7/2005 | Leasure et al. | | 711/127 |
| 6,972,769 B1 * | 12/2005 | Nebeker et al. | | 345/552 |
| 7,246,203 B2 * | 7/2007 | Moat et al. | | 711/133 |
| 7,292,239 B1 * | 11/2007 | Moreton et al. | | 345/419 |
| 7,400,325 B1 * | 7/2008 | Gimby et al. | | 345/421 |
| 7,610,469 B2 * | 10/2009 | Ansari | | 711/201 |
| 7,630,585 B2 * | 12/2009 | Abel et al. | | 382/303 |
| 7,660,967 B2 * | 2/2010 | Hutson | | 712/9 |
| 7,783,860 B2 * | 8/2010 | Luick et al. | | 712/6 |
| 2004/0186980 A1 * | 9/2004 | Ansari | | 712/4 |
| 2005/0055536 A1 * | 3/2005 | Ansari | | 712/4 |
| 2005/0286633 A1 * | 12/2005 | Abel et al. | | 375/240.16 |
| 2006/0155965 A1 * | 7/2006 | Altman et al. | | 712/215 |
| 2008/0114969 A1 * | 5/2008 | Gonion et al. | | 712/223 |
| 2008/0256300 A1 * | 10/2008 | Lee et al. | | 711/125 |
| 2009/0015589 A1 * | 1/2009 | Luick et al. | | 345/427 |
| 2009/0037694 A1 * | 2/2009 | Luick et al. | | 712/204 |

* cited by examiner

*Primary Examiner* — Kee M Tung
*Assistant Examiner* — Haixia Du
(74) *Attorney, Agent, or Firm* — Patterson & Sheridan LLP

(57) ABSTRACT

A method and apparatus for processing vector data is provided. A processing core may have a data cache and a relatively smaller vector data cache. The vector data cache may be optimally sized to store vector data structures that are smaller than full data cache lines.

10 Claims, 3 Drawing Sheets

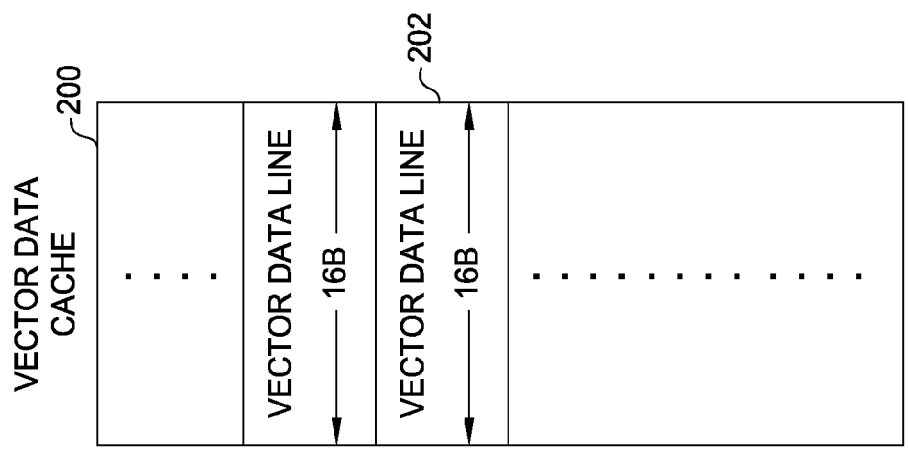
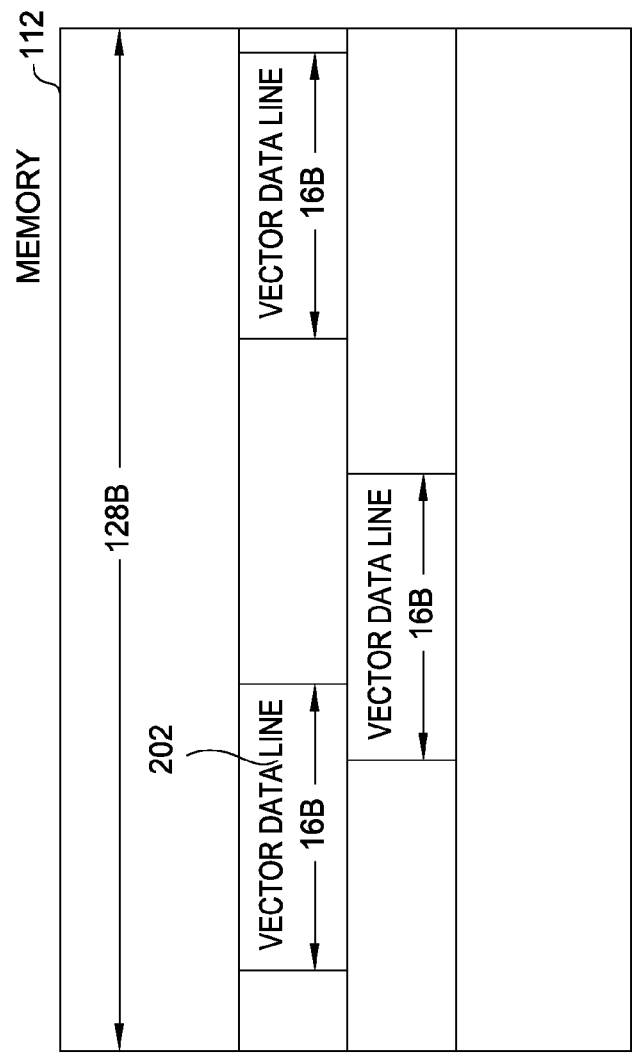

DYNAMIC DATA TYPE ALIGNED CACHE OPTIMIZED FOR MISALIGNED PACKED STRUCTURES

BACKGROUND OF THE INVENTION

1. Field of the Invention

Embodiments of the invention generally relate to the field of graphics processing. More specifically, the present invention relates to utilization of memory bandwidth within graphics processors.

2. Description of the Related Art

It is a well known conundrum that software engineers like to structure data in forms that are less than optimal for the target hardware that it runs on, and hardware engineers like to design hardware that is not optimal for software engineers. In terms of vertex structures it is very common to specify vertex attributes along with the vertex in memory. However, if only the vertex position is used for most computation a large portion of the cache and thus memory bandwidth is not utilized efficiently. The Data Type Aligned Cache utilizes a vector line size and allocates based on the byte address of the data structure. This allows the cache to cache vectors, or other data types, not blocks of memory which results in an extremely dense cache in terms of geometric primitives.

In terms of vertex structures it is very common to specify vertex attributes along with the vertex in memory. These structures will eventually be allocated in a data cache. The vertex positions can be different from frame-to-frame, causing low data cache hit rates on vertex positions data. If only the vertex position is used for most computations, a large portions of the cache, and thus memory bandwidth, are not utilized efficiently. Ideally, data that will be reused, i.e. local variables, will be stored in the graphics processing engines integer unit data cache (core data cache). This will increase the hit rate in the cores data cache.

SUMMARY OF THE INVENTION

One embodiment provides a method of processing data. The method generally includes fetching one or more cache lines of data, the cache lines having a first width corresponding to a width of a core data cache, extracting, from the one or more cache lines, a vector data structure having a second width that is less than the first width, and storing the vector data structure in a vector data cache that is smaller than the core data cache and has a line width corresponding to the second line width.

One embodiment provides a processor. The processor generally includes at least one vector processing pipeline, a core data cache for holding cache lines of data, the cache lines having a first width corresponding to a width of the core data cache, a vector data cache for storing vector data structures, and access circuitry. The vector data structures have a second width that is less than the first width, the vector data cache is smaller than the core data cache, and the vector data cache has a width corresponding to the second width. The access circuitry is for extracting a vector data structure from one or more data cache lines, and storing the vector data structure in the vector data cache.

One embodiment provides a plurality of processing units, including at least one processing unit having a vector processing pipeline, a core data cache for holding cache lines of data accessible by the vector processing pipeline, the cache lines having a first width corresponding to a width of the core data cache, a vector data cache, and access circuitry. The vector data cache is accessible by the vector processing pipeline for storing vector data structures, wherein the vector data structures have a second width that is less than the first width, the vector data cache is smaller than the core data cache, and the vector data cache has a width corresponding to the second width. The access circuitry is for extracting a vector data structure from one or more data cache lines, and storing the vector data structure in the vector data cache.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2A is an illustration of misaligned vector data lines within memory.

FIG. 2B is an illustration of aligned, packed vector data lines within a vector data cache.

DETAILED DESCRIPTION OF THE PREFERRED EMBODIMENTS

The present invention generally relates to the field of graphics processing. More specifically, the present invention relates to incorporating a core data cache and a separate vector data cache to store vertex positions. The vector data cache is created specifically for vector lined sized data and can allocate based on the byte address of the data structure. This allows for more vectors to be stored closer to the graphics processing engine (GPE). Further, the vector data cache may be larger than the core's data cache, and allows the programmer to pre-fetch a frame or even multiple frames and store the data in the vector data cache.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

EXEMPLARY SYSTEM

Figure 1:
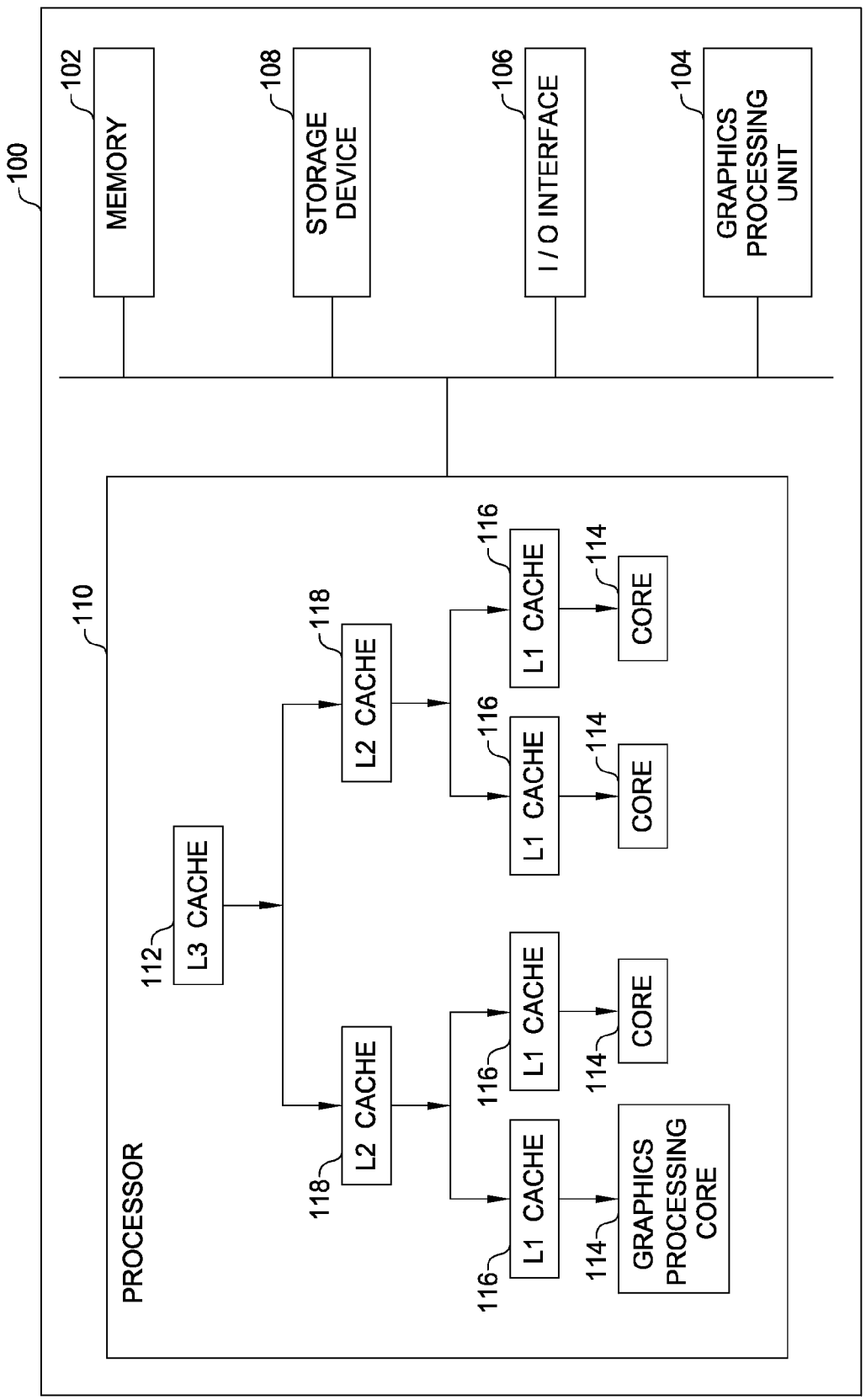
FIG. 1 is a system level view of a processor.

FIG. 1 illustrates an exemplary system 100 according to one embodiment of the invention. As illustrated system 100 includes a processor 110, L3 cache/L4 cache/memory 102, graphics processing unit (GPU) 104, input/output (IO) interface 106, and a storage device 108. The memory 102 is preferably a random access memory sufficiently large to hold the necessary programming and data structures operated on by processor 110. While memory 102 is shown as a single entity, it should be understood that memory 102 may in fact comprise a plurality of modules, and that memory 112 may exist at multiple levels, for example, L3 cache, L4 cache, and main memory 102.

Storage device 108 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 102 and storage 116 could be part of one virtual address space spanning multiple primary and secondary storage devices.

IO interface 106 may provide an interface between the processor and an input/output device. Exemplary input devices include, for example, keyboards, keypads, light-pens, touch-screens, track-balls, or speech recognition units, audio/video players, and the like. An output device can be any device to give output to the user, e.g., any conventional display screen.

Graphics processing unit (GPU) 104 may be configured to receive graphics data, for example, 2-Dimensional and 3-Dimensional graphics data, from a processor 110. GPU 104 may perform one or more computations to manipulate the graphics data, and render images on a display screen.

Processor 110 may include a plurality of processor cores 114 and one or more of the processing cores may be a graphics processing core. Processors cores 114 may be configured to perform pipelined execution of instructions retrieved from memory 102. Each processor core 114 may have an associated L1 cache 116. Each L1 cache 116 may be a relatively small memory cache located closest to an associated processor core 114 and may be configured to give the associated processor 114 fast access to instructions and data (collectively referred to henceforth as data).

Processor 110 may also include at least one L2 cache 118. An L2 cache 118 may be relatively larger than a L1 cache 114. Each L2 cache 118 may be associated with one or more L1 caches, and may be configured to provide data to the associated one or more L1 caches. For example a processor core 114 may request data that is not contained in its associated L1 cache. Consequently, data requested by the processor core 114 may be retrieved from an L2 cache 118 and stored in the L1 cache 116 associated with the processor core 114. In one embodiment of the invention, L1 cache 116, and L2 cache 118 may be SRAM based devices. However, one skilled in the art will recognize that L1 cache 116 and L2 cache 118 may be any other type of memory, for example, DRAM.

For some embodiments the processor 110 may be processing graphics. Complex graphics are often represented by a plurality of geometric primitives, such as triangles. The positions of these triangles are represented by sets of vertices. Often times vertex attributes are included along with the vertices in memory to form vertex structures. These structures may contribute to the misalignment of vector data within the memory 102.

FIG. 2A illustrates the misalignment of vector data within the memory 112. As illustrated, a width of the memory 112 may be greater than a width of a vector data line. For example, the memory 112 may be 128 bytes wide, while a vector data line may be 16 bytes wide. A memory that is wider than a vector data line may result in misaligned memory transactions. Misaligned memory transactions may include a single vector data line running divided between two separate memory lines, vector data lines separated by other data, or several vector data lines occupying a single memory line.

To increase the hit rate in the core data cache, a separate vector data cache may be created specifically for vector line sized data that changes, while vertex attributes and other, less dynamic, pieces of data remain in the core data cache. For some embodiments, the L2 cache 118 may be a physically unified cache partitioned into a vector data cache and a core data cache, while in other embodiments there may be two physically distinct L2 caches, one vector data cache and one core data cache.

FIG. 2B illustrates how vector data lines 202 are aligned and tightly packed within a vector data cache 200. For instance, as mentioned in a previous example, a vector data line may be 16 bytes wide; accordingly, the vector data cache may be 16 bytes wide. The vector data cache may be implemented with many architected cache designs. For example, a vector data cache may be implemented with an M-Way set associative design.

Figure 3:
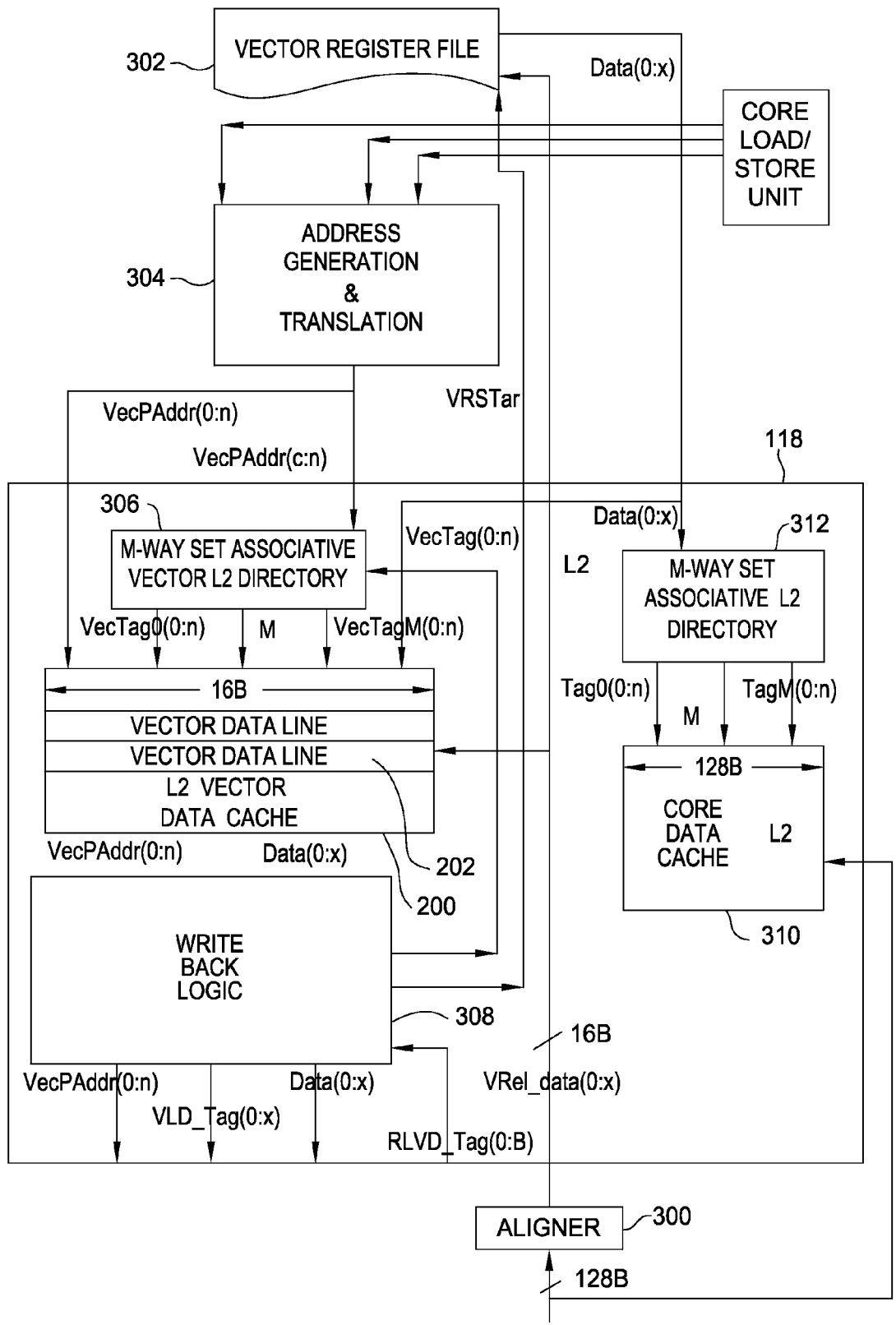
FIG. 3 is one embodiment of a vector data cache with an aligner.

FIG. 3 illustrates a system that may contain a vector register file 302, an address generation and translation unit 304, an aligner 300 and an L2 cache 118. Within the L2 cache 118, a vector data cache 200 receives vector data lines 202, which may be 16 bytes wide, from the data aligner 300. The data aligner 300 may receive large data lines, which may be 128 bytes wide, from memory 112, and extract vector data lines from the large data lines. In some embodiments, the data aligner 300 may allocate vector data lines based on the byte address of the data structure. This allocation may allow for more vectors to be stored tightly packed and closer to the graphics processing core, which may result in decreased memory access latency.

Data aligner 300 may be bypassed when large data lines, which may be 128 bytes wide, are sent from memory 112 to a core data cache 310.

In some embodiments the vector data cache 200 may be larger in total storage capacity than a core data cache 310, allowing a programmer to pre-fetch a single frame or multiple frames of scene data. This may optimize memory bandwidth by hiding the memory access latency, for example, with one frame being processed while another frame is being fetched.

Besides going to the Vector Data cache, aligned 16 byte vector data lines may also be sent to a vector register file 302. Within the vector register file 302, the vector data lines 202 may be stored in an array of registers. From these registers, vector data lines may be processed as determined by the graphics processing core 114 (not shown). However, if the vector data line 202 for which the graphics processing core is looking is not present in the vector register file 302, then the vector data line 202 is sought after else where (e.g., from the vector data cache 200).

To seek the vector data lines elsewhere, an address is generated and translated in the Address Generation and Translation element 304. The translated address that comes from element 304 may be sent to the M-Way Set Associative Vector L2 Directory 306. Element 306 may use a partial address to reference a block of cache and the corresponding state of that block. Meanwhile, the translated address that comes from element 304 may be sent to the vector data cache 200. Depending on the systems architecture, the vector data cache 200 may be split or unified with the core data cache 310.

If the vector data line 202 is found within the vector data cache, the vector data line 202 may be sent to the write back logic element 308. Then the vector data line may be sent to the vector register file 302 to be processed by the graphic processing unit 114. However, if the vector data line 202 is not found with the vector data cache 200, the translated address from element 304 may be passed through the vector data cache 200 to the write back logic element 308. The translated address may then be used to seek the requested vector data line elsewhere in memory.

While the foregoing is directed to embodiments of the present invention, other and further embodiments of the invention may be devised without departing from the basic scope thereof, and the scope thereof is determined by the claims that follow.

What is claimed is:

1. A method of caching data for use by a graphics processing core, comprising:
    fetching two or more cache lines of data from a core data cache having a first cache line width, wherein the two or more cache lines include a vector data structure that is misaligned within the two or more cache lines and spans more than one of the two or more cache lines;
    extracting, from the fetched two or more cache lines, two or more portions of the vector data structure;
    aligning the extracted two or more portions of the vector data structure to produce an aligned vector data structure, the aligned vector data having a second width;
    storing the aligned vector data structure in a vector data cache having a cache line width equal to the second width of the aligned vector data structure; and
    writing the aligned vector data structure to a vector register file, in which the aligned vector data structure is stored in an array of registers,
    wherein the graphics processing core is configured to query the vector register file for a first vector data structure to process, and
    wherein the graphics processing core is configured to query the vector data cache for the first vector data structure only after determining that the first vector data structure is not present within the vector register file.

2. The method of claim 1, wherein the vector data structure comprises graphics vertex data.

3. The method of claim 2, comprising:
    storing in the vector data cache, vertex data for multiple frames of graphics data.

4. A processor, comprising:
    at least one vector processing pipeline;
    a core data cache for storing cache lines of data, the cache lines having a first cache line width;
    a vector data cache for storing vector data structures, wherein the vector data cache has a second cache line width that is less than the first cache line width, and wherein the vector data cache is smaller than the core data cache; and
    access circuitry for:
        extracting two or more portions of a vector data structure from two or more data cache lines from the core data cache, wherein the vector data structure is misaligned within the two or more data cache lines and spans more than one of the two or more data cache lines,
        aligning the extracted two or more portions of the vector data structure to produce an aligned vector data structure,
        storing the aligned vector data structure in the vector data cache, wherein the aligned vector data structure has a width equal to the second cache line width of the vector data cache, and
        writing the aligned vector data structure to a vector register file, in which the aligned vector data structure is stored in an array of registers,
        wherein the processor is configured to query the vector register file for a first vector data structure to process, and
        wherein the processor is configured to query the vector data cache for the first vector data structure only after determining that the first vector data structure is not present within the vector register file.

5. The processor of claim 4, wherein the vector data structure comprises graphics vertex data.

6. The processor of claim 5, wherein the processor is configured to store in the vector data cache, vertex data for multiple frames of graphics data.

7. A system, comprising:
    a plurality of processing units, including at least one processing unit having a vector processing pipeline;
    a core data cache for storing cache lines of data, the cache lines having a first cache line width;
    a vector data cache for storing vector data structures, wherein the vector data cache has a second cache line width that is less than the first cache line width, and wherein the vector data cache is smaller than the core data cache; and
    access circuitry for:
        extracting two or more portions of a vector data structure from two or more data cache lines from the core data cache, wherein the vector data structure is misaligned within the two or more data cache lines and spans more than one of the two or more data cache lines,
        aligning the extracted two or more portions of the vector data structure to produce an aligned vector data structure,
        storing the aligned vector data structure in the vector data cache, wherein the aligned vector data structure has a width equal to the second cache line width of the vector data cache, and
        writing the aligned vector data structure to a vector register file, in which the aligned vector data structure is stored in an array of registers,
        wherein the at least one processing unit is configured to query the vector register file for a first vector data structure to process, and
        wherein the at least one processing unit is configured to query the vector data cache for the first vector data structure only after determining that the first vector data structure is not present within the vector register file.

8. The system of claim 7, wherein the vector data structure comprises graphics vertex data.

9. The system of claim 8, wherein the at least one processing unit having a vector processing pipeline comprises a graphics processing unit.

10. The system of claim 9, wherein the at least one processing unit is configured to store in the vector data cache, vertex data for multiple frames of graphics data.

* * * * *